United States Patent [19]

Yan

[11] Patent Number: 4,679,040

[45] Date of Patent: Jul. 7, 1987

[54] COMPUTER-GENERATED IMAGE SYSTEM TO DISPLAY TRANSLUCENT FEATURES WITH ANTI-ALIASING

[75] Inventor: Johnson K. Yan, Milpitas, Calif.

[73] Assignee: The Singer Company, Binghamton, N.Y.

[21] Appl. No.: 605,045

[22] Filed: Apr. 30, 1984

[51] Int. Cl.[4] .............................................. G09G 1/16
[52] U.S. Cl. ................... 340/747; 340/729; 340/728; 340/703
[58] Field of Search ............... 340/747, 729, 793, 703, 340/725, 721, 728; 434/36, 41, 43, 38

[56] References Cited

U.S. PATENT DOCUMENTS

| | | | |
|---|---|---|---|
| 3,944,997 | 3/1976 | Swallow | 340/747 |
| 4,297,691 | 10/1981 | Kodama et al. | 340/703 |
| 4,384,338 | 5/1983 | Bennett | 340/729 |
| 4,475,104 | 10/1984 | Shen | 340/729 |
| 4,482,893 | 11/1984 | Edelson | 340/747 |
| 4,509,043 | 4/1985 | Mossaides | 340/747 |
| 4,570,233 | 2/1986 | Yan et al. | 340/723 |

Primary Examiner—Marshall M. Curtis
Attorney, Agent, or Firm—Douglas M. Clarkson; Barry L. Haley

[57] ABSTRACT

A computer-generated image system that is described in the Disclosure has a videoprocessor circuit with an integrator circuit to assign a predetermined identification to each edge of each face of any image that is to be displayed. Also, it has a "skip-over logic" circuit to identify any area in the face of any image to be displayed that requires no further intensity modification.

Perhaps a key to the success of this arrangement in accordance with the described invention is its provision of a signal modifier circuit to apply a pre-determined intensity modification factor to any area not identified by the skip-over logic circuit. By this arrangement, any area that is to be displayed behind a translucent area will be visible although at a reduced intensity.

3 Claims, 17 Drawing Figures

COMPUTER-GENERATED IMAGE SYSTEM TO DISPLAY TRANSLUCENT FEATURES WITH ANTI-ALIASING

TECHNICAL FIELD

The present invention, generally, relates to computer-generated image systems and, more particularly, to a computer-generated image system adaptable for use in a flight simulator for displaying translucent features.

BACKGROUND ART

This invention is an improvement on a Modular Digital Image Generator, Ser. No. 394,229 filed July 1, 1982, U.S. Pat. No. 4,930,233) by the present applicant and Judit K. Florence, and assigned to the same Assignee as the present invention. The disclosure in Ser. No. 394,229 therefore, is incorporated by reference herein.

Since the first development of computer-generated image systems to display a view out of the window of a simulator cockpit, efforts have been under way to increase the realism that such images are capable of providing. Efforts have been successful in providing the effective training cues needed to train a pilot. However, the realism viewed in a scene has escaped all efforts up to now.

It has long been felt that having a computer-generated image system with an effective translucency capability would be extremely desirable, particularly for simulation of translucent clouds and smoke as well as for dynamic shadowing effects. More importantly, it can be used for blending two adjacent levels of detail of images to effect gradual level of detail change. This level-of-detail blending capability is useful especially for gradual re-introduction of an image as a pilot moves closer and closer to it and gradual fading of an image as the pilot recedes from it.

Real-time computer-generated image systems, particularly the so-called "out-of-the-window visual systems", have increased greatly the scope of simulator training. With these computer-generated image systems, it is possible to train pilots in visually referenced flight maneuvers such as landing, takeoff, navigation, and weapon delivery.

A typical computer-generated image system as used in the past has been arranged as a "scanline based" processor. This means that an image is generated scanline-by-scanline synchronously as it is displayed.

The basic operation of the "scanline based" processor is found in an article entitled "Computer Image Generation for Flight Simulation" by B. Schachter in Computer Graphics and Applications, dated October, 1981.

Therefore, the scanline based processor used in the past has included a geometric processor, a scanline computer, a video generator, and an appropriate display device. The geometric processor is interfaced with a data base which supplies the geometric processor with the information that is used to process a particular image.

In particular, this information has included a description of the images that are to be displayed. The images are defined by a list of "faces" and the faces, in turn, are defined by a list of "edges".

Translucency capability is utilized also to simulate level-of-detail blending in the following manner. Each image to be displayed is modeled to several levels of detail. Rather than switching from one level to the next as a function of the angular subtense of the image, the switching is done gradually from one level to the next using translucency capability as described in detail hereinafter.

The geometric processor is furnished with a list of faces which describes images to be displayed. The geometric processor will act on this list of faces and perform elimination of backward-facing surfaces, geometric transformations and a process called "windowing".

Furthermore, the geometric processor customarily will provide a tonal description of each face, such as shading and fading. The results of the geometric processor computations are stored in a memory and are transmitted to a scanline computer.

The scanline computer normally uses the information received from the geometric processor to determine which of the faces are occulted and which of the faces are to be displayed on the display device. In particular, the scanline computer works on edge "intersections" and, as its name suggests, processes the edge intersection information serially, one display scanline at a time. Since the displayed image is generated scanline by scanline, this scanline-based computer-generated image system performance is in part limited by its ability to handle the most complex scanline, i.e., is limited by a maximum number of edge intersections per scanline to produce an acceptable displayed image.

The output of the scanline computer usually is connected to a video processor. In such video processor, the information for displaying the visible faces, which is furnished by the scanline computer, is transformed into picture-element-by-picture-element information. As used hereinafter, the term "picture element" is called a "pixel".

To review briefly, the video processor transforms the pixel information into a digital format that corresponds to the intensity of each displayed pixel. Finally, the video processor provides a mechanism so that the digital pixel information is converted into an analog electrical voltage (or a video signal) which is used to drive a display in a raster format.

The display customarily includes a conventional projector or a cathode ray tube. A typical cathode ray tube display has a succession of equidistant scanlines, where each scanline is made up of many picture elements (called pixels). The cathode ray tube constructs a displayed image by interlacing two separate "fields", where one field contains even-numbered scanlines and the other field contains odd-numbered scanlines. The interlaced fields are called a "frame".

Although the particular scanline based processor that has been developed in the past provides an important advance in the art of computer-generated image systems for flight simulation particularly, it does not fully satisfy the objectives of enhancing realism to the point that is appropriate for modern simulator uses. The scanline based processor's arrangements are limited in their ability to handle the more complex scanlines. The limitation is due to the time available to process a scanline while maintaining synchronism with the display.

This and other insufficiencies of the prior art computer-generated image systems suggest that a need has existed for a new approach to a solution to these problems. The present invention provides such a new approach, and it improves upon the ability of prior computer-generated image systems.

SUMMARY OF THE INVENTION

Accordingly, it is a principal object of the present invention to provide a computer-generated image system that is capable of producing visual images with more realism than is obtainable by anything previously known.

In a computer-generated image system that is constructed and arranged in accordance with the principles of the present invention, the video processor circuit has an integrator circuit to assign a predetermined identification to each edge of each face of any image that is to be displayed. Also, it has a "skip-over logic" circuit to identify any area in the face of any image to be displayed that requires no further intensity modification. Perhaps a key to the success of this arrangement in accordance with the invention is its provision of a signal modifier circuit to apply a predetermined intensity modification factor to any area not identified by the skip-over logic circuit. By this means, any area that is to be displayed behind a translucent area will be visible although at a reduced intensity.

BRIEF DESCRIPTION OF THE DRAWINGS

These aand other features of the present invention will be understood more clearly from a consideration of the following detailed description of the presently preferred embodiment taken in conjunction with the accompanying drawings, in which.

DETAILED DESCRIPTION OF THE INVENTION

Again, reference is made to Ser. No. 394,229 filed July 1, 1982, identified with greater particularity, supra. A computer-generated image system as has been described in Ser. No. 394,229 could process opaque objects only. Therefore, special effects such as translucent clouds, smoke, dust, shadows, etc. could not be simulated.

Figure 1:
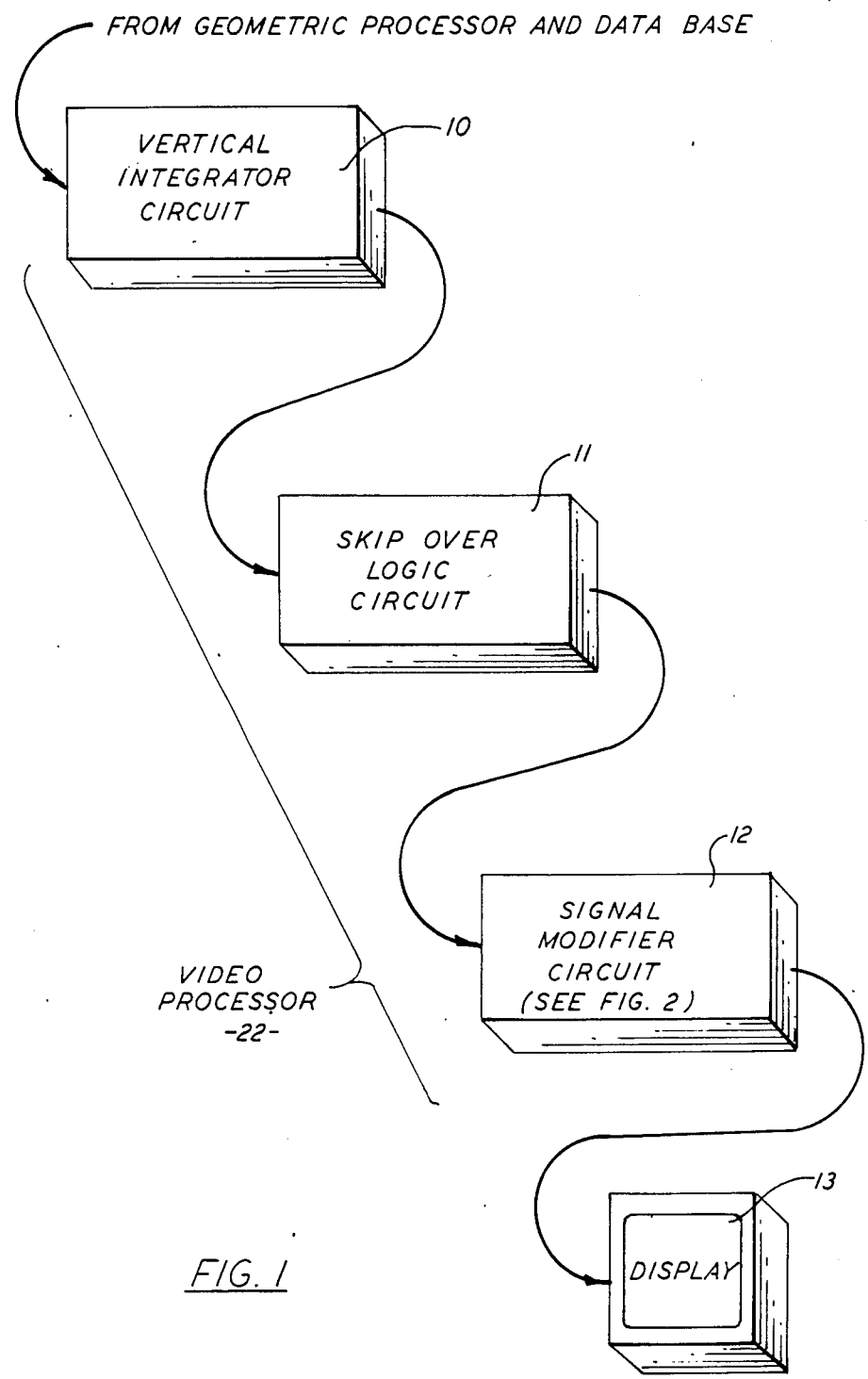
FIG. 1 shows in block diagram form an arrangement of component parts to accomplish the purposes of the present invention.

Referring now to FIG. 1 of the drawings, the numeral 10 identifies an integrator circuit which receives its input from a geometric processor circuit that computes the description of faces of the images to be displayed and provides information concerning the relative priority of each. The faces to be displayed in accordance with the present invention, are processed in an order which is prioritized also. This prioritizing order will be described in more detail presently.

From the integrator circuit 10, the signal is connected to a skip over logic circuit 11 where each pixel is identified separately, particularly if it requires no further intensity modification. From the skip-over logic circuit 11, the signal is connected to a signal modifier circuit 12 where a predetermined intensity modification factor is applied to each pixel that is not identified by the skip over logic circuit 11. From the signal modifier circuit 12, the signal is connected to a cathode ray tube display device 13.

Figure 2:
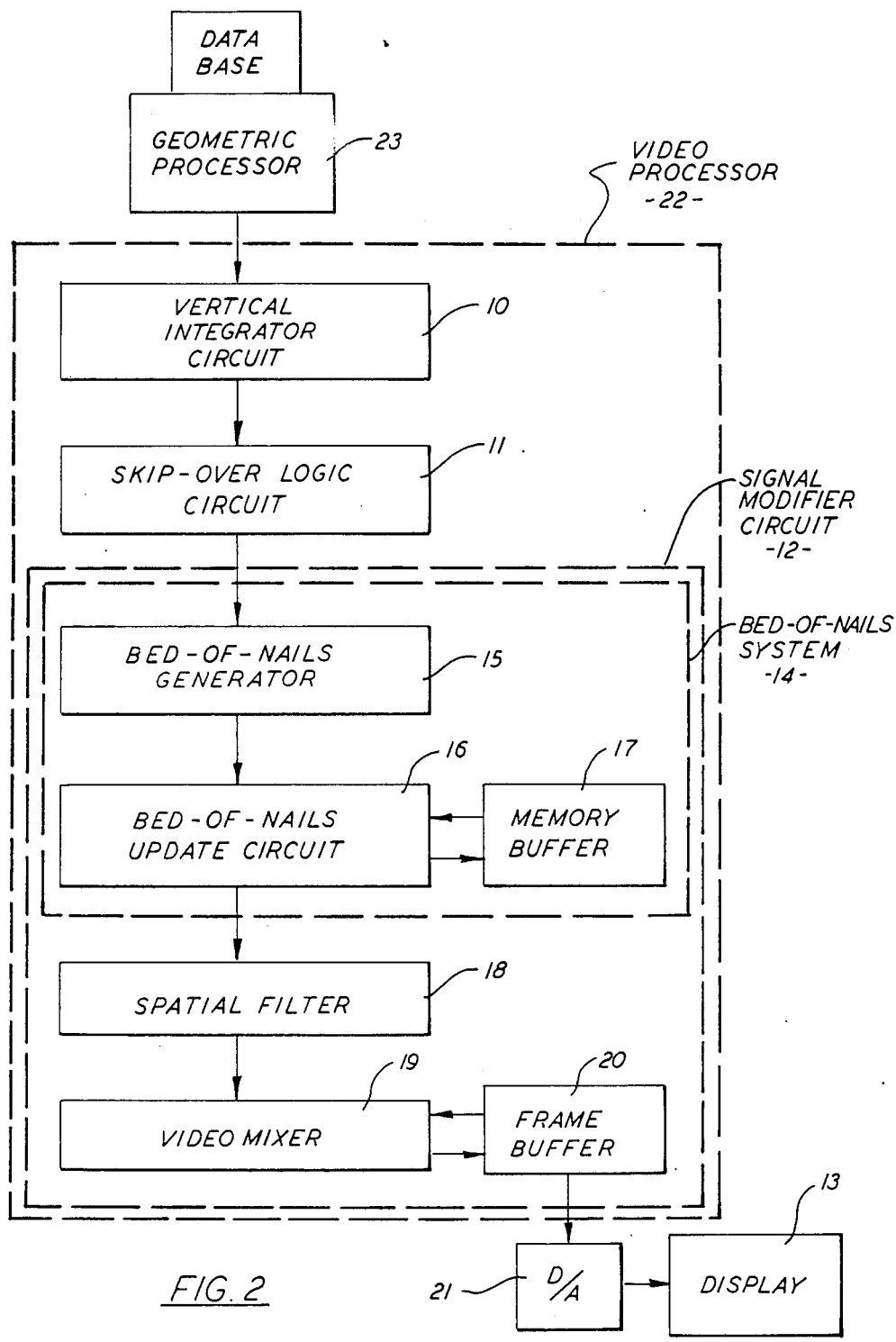
FIG. 2 is a circuit in block diagram form to show more details of the component parts of the arrangement in FIG. 1.

In FIG. 2, more details are shown for the signal modifier circuit 12. In particular, the skip-over logic circuit 11 is shown connected directly to a Bed-of-Nails system 14, which includes a Bed-of-Nails generator 15, connected to a Bed-of-Nails Update circuit 16 with intermediate connections to its own memory buffer circuit 17. The output from the Bed-of-Nails system 14 is connected through a spatial filter 18 to a video mixer circuit 19.

The video mixer circuit 19 has a frame buffer circuit 20 which also provides an output from the signal modifier circuit 12 to the cathode ray tube display 13 through a digital-to-analog converter 21. It can be seen in this FIG. 2 that the three component parts: the vertical integrator 10, the skip-over logic circuit 11, and the signal modifier circuit 12 make up a circuit identified as a video processor 22, also seen in FIG. 1 of the drawings.

The video processor 22 is connected to a geometric processor 23 to receive geometric information to describe the face of an image to be displayed which is assigned the highest priority listing. In particular, the geometric processor 23 transmits the geometric information to the video processor 22, therefore, in accordance with the particular priority assigned to each face edge.

The vertical integrator circuit 10 is the first component part within the video processor 22 to receive this geometric information. The vertical integrator circuit 10 receives information from the geometric processor 23 as to the location of each vertex and the beginning and ending edges as well as the slope of each edge that is to be displayed on the cathode ray tube display 13, provides the beginning edge parameter and the ending edge parameter, respectively, to the skip-over logic circuit 11. The skip-over logic circuit 11, in turn, determines which set of pixels are covered by the face to be displayed and which of these pixels have been covered completely by a higher priority face so that they need not be processed further.

The skip-over logic circuit 11 determines for each set of sample points whether or not the face is visible and non-occulted. The skip-over logic circuit 11 functions to provide the signal modifier circuit 12 with the information only as to which sample points are visible. Those sample points which are determined by the skip-over logic circuit 11 to be non-visible or occulted are "skipped over" by the processing aparatus.

The skip-over logic circuit 11 also determines which of the pixels are to be processed further by the Bed-of-Nails system 14.

Efforts have continued to provide translucency capability in computer-generated image systems which permit objects of any degree of translucency to be displayed. In the following description, the translucency of a face is defined by a translucency number "T", and the opacity of a face is defined by an opacity number "Q". The two numbers are fractions with values between zero and one. "Q" is the complement of "T", that is, "Q" is equal to $(1-T)$. The number "T" specifies the fraction of energy of things behind the face that is transmitted through the face. The number "Q" specifies the fraction of energy of the face itself that is visible to an observer.

Therefore, if a face has a value $T=1$, then 100% of the energy of things behind is visible and 0% of its own intensity is visible to the observer, indicating that the face is totally transparent. On the other hand, if a face has a value of $T=0$, then 0% of things behind is visible and 100% of its own intensity is visible to the observer, indicating that the face is totally opaque. If "T" is between 0 and 1, then the face is partially transparent, allowing part of the intensity of the face and part of the intensity of things behind it to be visible to the observer.

All computer-generated image systems are limited in their processing capability, and because of this, objects cannot be brought into view on the screen of a cathode ray tube display when they are only about a pixel in size. They are usually brought into view abruptly when they occupy a sizable area on the screen. This causes a very distracting "popping", the sudden appearance of an object.

Figure 5:
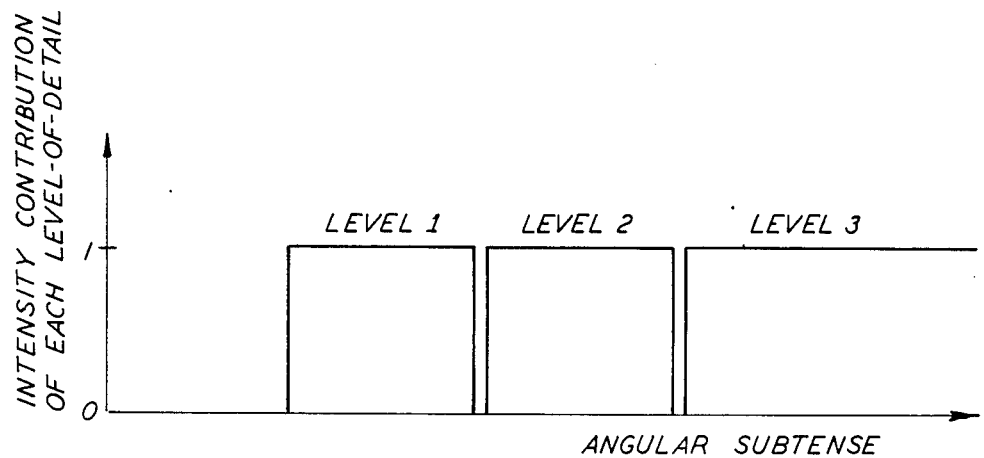
FIG. 5 is a plot of three levels of the intensity contribution as it relates to angular subtense.

"Popping" is not restricted to the initial appearance of an object. To conserve polygon processing capability, each object is modelled at several different levels of detail; the appropriate model is displayed as a function of the angle subtended, as illustrated in FIG. 5 of the drawings. Popping occurs when an image is switched abruptly from one level-of-detail to another.

Full translucency capability can be utilized to effect both the gradual introduction of an image as well as the gradual switching of levels of detail. An object is brought into view on a display when it occupies a sizable area on the screen by starting with total transparency and gradually reducing the translucency until the object is totally opaque as it comes closer to the observer.

Figure 6:
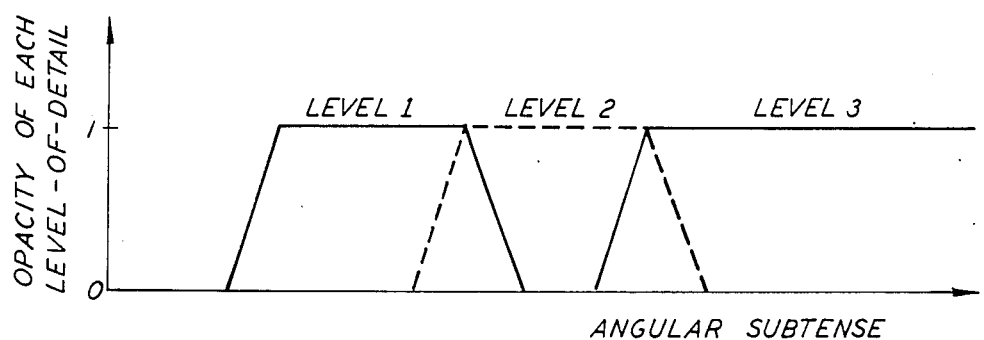
FIG. 6 is a plot of opacity for three levels-of-detail versus angular subtense.

The object, then, stays opaque for a preselected distance, and then, as the observer continues to come closer, a higher level-of-detail model is faded in by gradually decreasing its translucency. When it is opaque, the low-detail model is faded by gradually increasing its translucency until it is removed. In other words, the low-detail model does not begin to become translucent until the high-detail model is opaque. This is illustrated in FIG. 6 of the drawings for three levels of detail.

When two levels of detail are blended, the lower level-of-detail model is processed right after the higher level-of-detail model when the images are processed in a top-down order.

Figure 7:
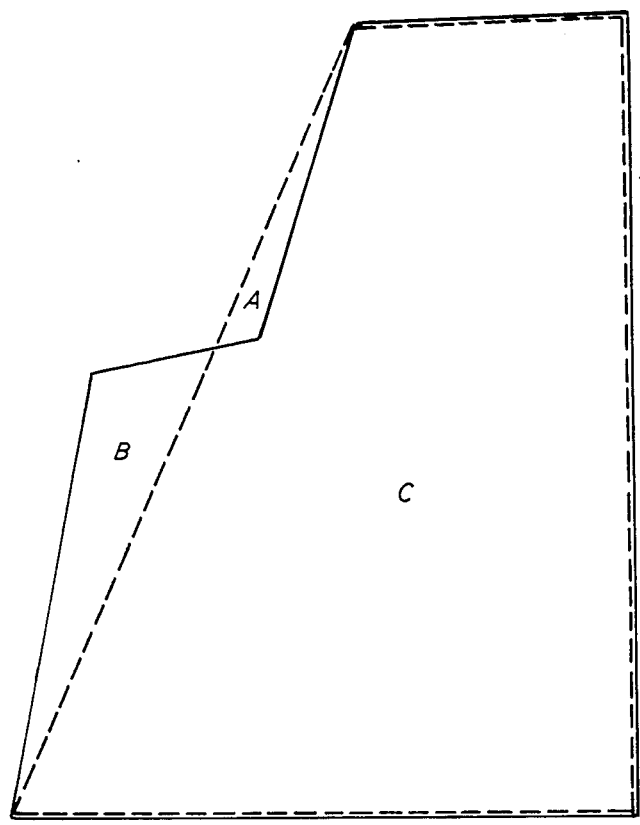
FIG. 7 is a view of two images in an overlay arrangement as an aid in the description of the invention.

To illustrate the gradual level-of-detail switching, an object with only two levels of detail is shown in FIG. 7 of the drawings. In FIG. 7, the low level-of-detail area is indicated by dashed lines, and the high level-of-detail area is indicated by solid lines. Generally, three areas are identified, A, B, and C. The area A contains only the low level-of-detail, whereas the area B contains only the high level-of-detail. The area C is where both levels-of-detail overlap.

Figure 8:
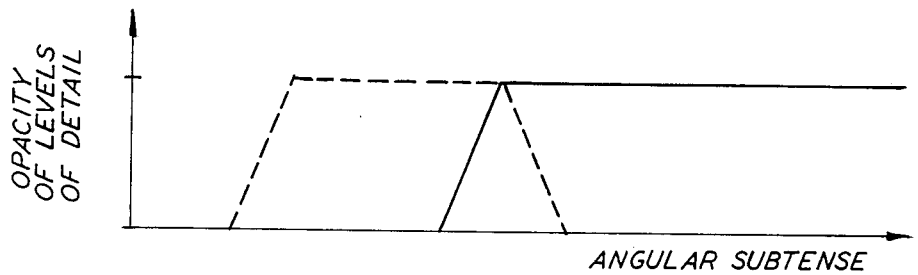
FIG. 8 is a plot of opacity for the two levels-of-detail versus angular subtense for the two images of FIG. 7.
Figure 9:
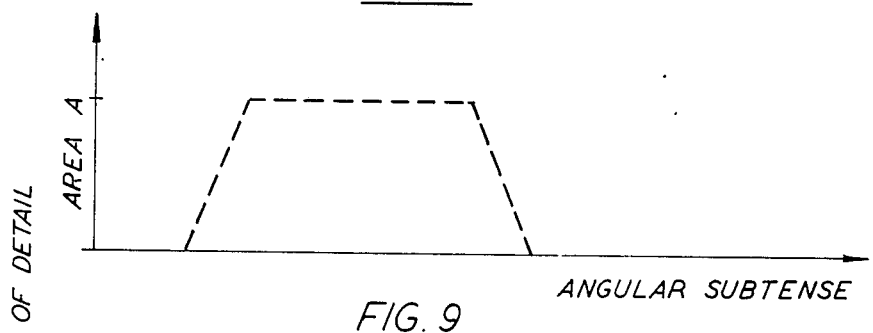
FIG. 9 is a plot of the intensity contribution of the level-of-detail on the Area A shown in FIG. 7.
Figure 10:
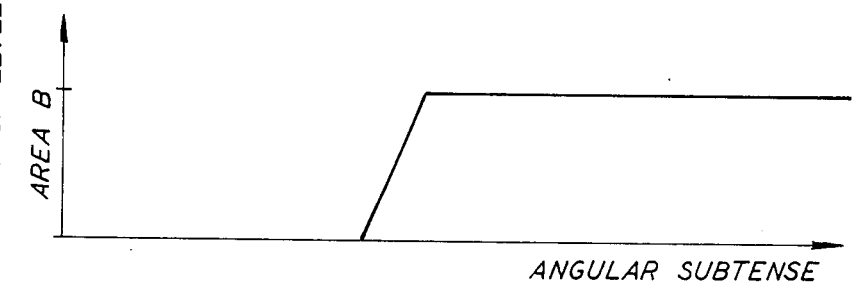
FIG. 10 is a plot of the intensity contribution of the level-of-detail on the Area B shown in FIG. 7.
Figure 11:
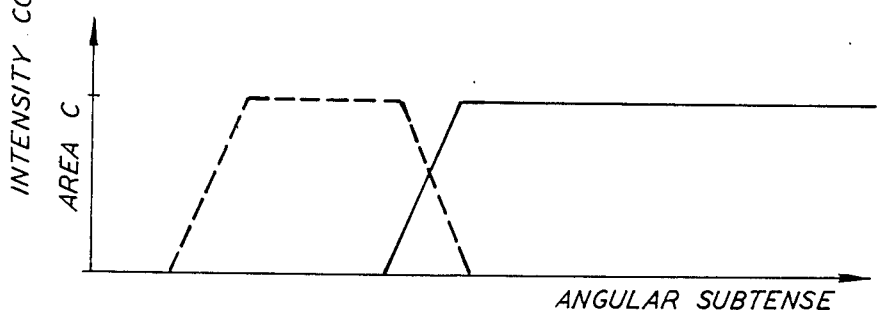
FIG. 11 is a plot of the intensity contribution of the level-of-detail on the Area C shown in FIG. 7.

The opacity of the two levels-of-detail of this image is illustrated in FIG. 8 of the drawings. Using the opacity curve in FIG. 8 for the two levels-of-detail of the image and by processing first the high level-of-detail when they are blended, the contribution of each level-of-detail of the three areas A, B, and C of FIG. 7 of the drawings is illustrated in FIGS. 9, 10, and 11. Notice particularly that in these three areas, the contribution of each level-of-detail changes gradually without any sudden jump, as illustrated in FIG. 5 of the drawings.

Figure 12:
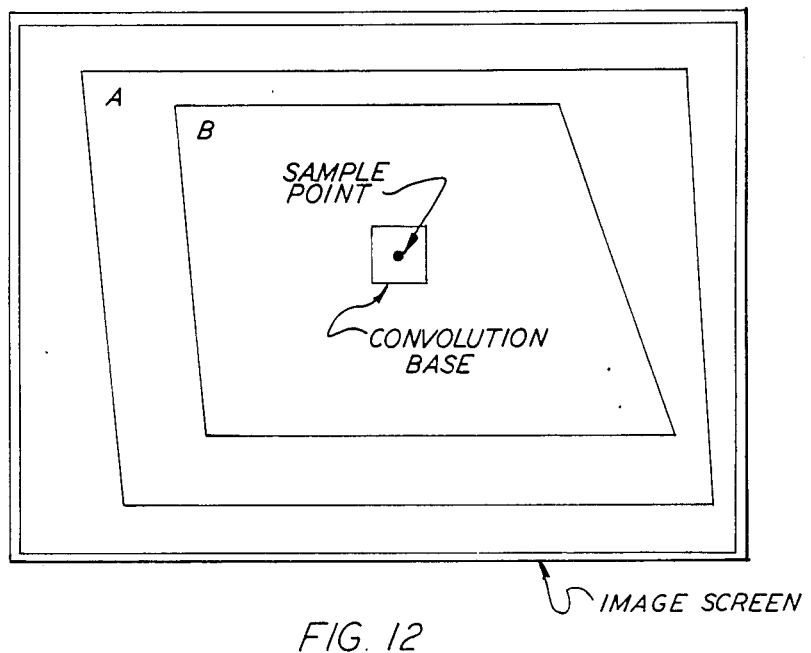
FIG. 12 is a view of an image with two levels-of-detail as an aid in the description of the invention.

FIG. 12 of the drawings shows two overlapping faces on the screen of a cathode ray tube. The top face "B" is translucent and has an opacity of QB. The bottom face "A" is opaque, i.e., has opacity equal to 1. In a "sample point" at which both faces A and B are "visible", the Resultant Intensity, RI, is given by the equation:

$$RI = QB \times IB + TB \times IA \qquad (1)$$

In equation (1), if $TB=0$ (or if $QB=1$, since opacity is the complement of translucency), then the Resultant Intensity, is IB, indicating that the face "B" is totally opaque. On the other hand, if $TB=1$, then the Resultant Intensity is IA, indicating that the face "B" is totally transparent.

Figure 13:
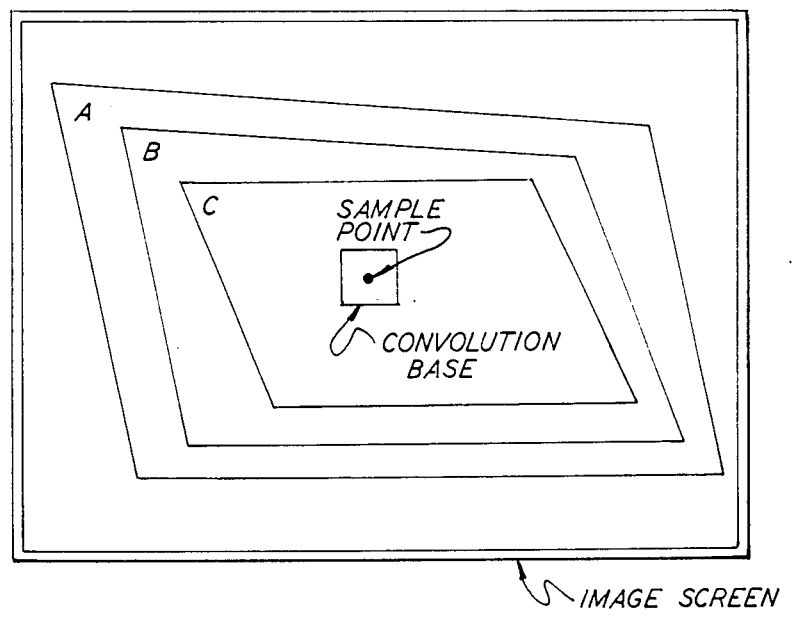
FIG. 13 shows three overlapping faces on the screen of a display, the top two faces B and C being translucent and the bottom face A being opaque, as an aid in describing the invention.

To compute the Resultant Intensity on a convolution base of multiple layers of translucent faces, refer to FIG. 13 of the drawings, which shows a face "C" in front of a face "B" and behind both is a face "A". According to the "Translucency" definition, the Resultant Intensity on the convolution base (shown in FIG. 13) due to the three faces "A", "B" and "C" can be computed recursively as follows:

$$RI = QC \times IC + (TC)[QB \times IB + (TB)IA] \qquad (2)$$

Where IA, IB and IC are the intensity of the three faces A, B, and C, respectively. QC and QB are the opacities of the faces A and B, respectively.

To use the above equation (2) to calculate top-down implementation of translucency, it is expanded to equation (3) as follows:

$$RI = QC \times IC + TC \times QB \times IB + TC \times TB \times IA \qquad (3)$$

Figure 14:
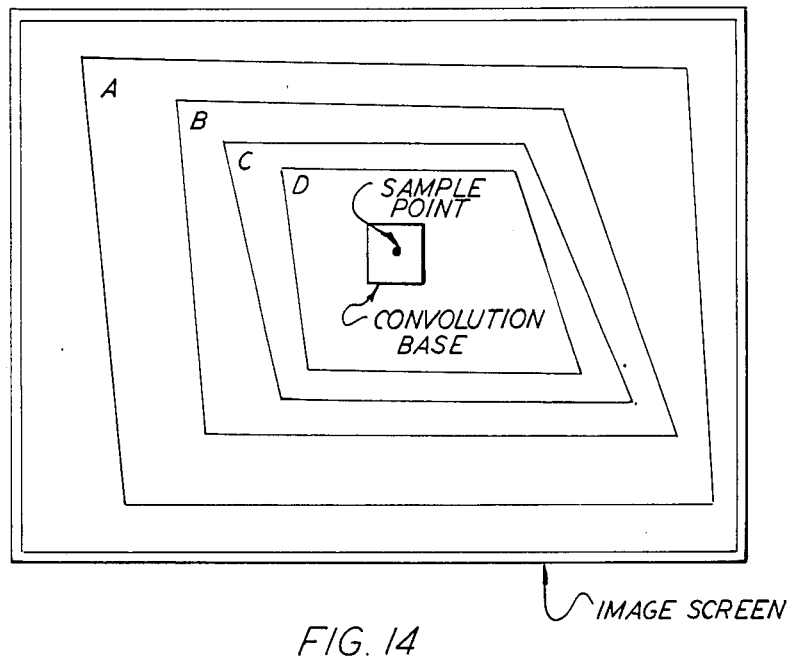
FIG. 14 shows four overlapping faces for the purpose of describing the invention more fully.

Continuing the "multiple layers" example further, a face "D" is positioned in front of the face "C", as shown in FIG. 14. Again, according to the translucency definition, supra, Resultant Intensity is given by the following equation (4):

$$RI = QD \times ID + (TD) \times [QC \times IC + TC \times QB \times IB + TC \times TB \times IA] \quad (4)$$

Expanding equation (4) gives the following equation (5):

$$RI = QD \times ID + TD \times QC \times IC + TD \times TC \times QB \times IB + TD \times TC \times TB \times IA \quad (5)$$

The Intensity contribution from a face is given by the product of translucences of faces in front of it, the opacity of the face and the intensity of the face. This general statement is true because the translucency in front of face "D" can be considered to be "1" since nothing is in front of it.

The above observation can be stated also in the following manner: the Intensity contribution from a face is given by the product of the combined translucency of faces in front of it, the opacity of the face and the Intensity of the face, where the combined translucency of faces in front is given by the product of the translucencies of faces in front of the face.

Therefore, in order to compute the Intensity contribution of each face on the convolution base shown in FIG. 14 when the faces are processed independently in the top-down priority order, the combined translucency of faces processed thus far must be computed and stored in a memory associated with the sample point so that the correct Intensity contribution of subsequent faces can then be computed. Thus, a memory cell associated with each sample point is required in accordance with the present invention. This memory is identified herein as the "translucency memory".

The number of bits required for a good, realistic, implementation of the translucency effect will vary depending upon the use to which this invention is put. Any particular number of bits may be verified by emulation, if desired. Assume that eight bits is sufficient for simulation purposes, since there are 512,000 sample points in a field update on a standard cathode ray tube screen, the size of the translucency memory is calculated as $512,200 \times 8$. It is interleaved and assigned to the four face processors the same way as the Bed-of-Nails memory.

To determine the Resultant Intensity for each sample point, such as the one shown in FIG. 13, a translucency factor is computed for each such sample point and stored in a translucency memory as a value "TM".

The Resultant Intensity for the sample point shown in FIG. 13 due to a translucent face is given by the product of the translucency factor read from a translucency memory, the opacity of the current face and the intensity of the current face. The translucency factor is updated and applied to the faces yet to come and is determined by the following general relationship:

$$TM(1-Q) \text{ or } TM - TM \times Q \quad (6)$$

When the top face C is processed, $TM = 1$ and $Q = QC$, and the Intensity due to the face C is $1 \times QC \times IC$, corresponding to the first step in the expanded Resultant Intensity equation (3) above. The updated translucency factor is TC and is stored temporarily in the translucency memory.

When the face B is processed, the Intensity due to the face B is $$TC \times QB \times IB \quad (7)$$

corresponding to the second step in the equation (3) above. The updated translucency, therefore, is given by this relationship:

$$(TC) \times (TB) \quad (8)$$

Finally, when the face "A" is processed, $TM = TC \times TB$ and $Q = QA = 1$. The Intensity due to the face "A", therefore, is:

$$TC \times TB \times IA \quad (9)$$

corresponding to the third step in the equation (3) above. The updated translucency factor is:

$$TC \times TB \quad (10)$$

indicating that anything behind the face "C" will not be visible and need not be processed.

In the example of multiple layers of translucent faces shown in FIGS. 12, 13, and 14, all of the faces cover the entire convolution base. The computation shown in equation (5) only applies when all of the faces involved in a convolution base cover it entirely.

Figure 15:
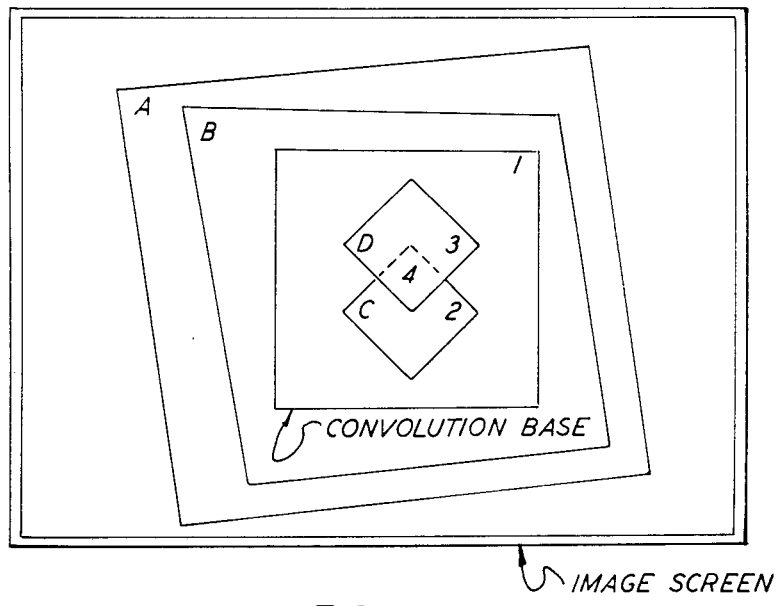
FIG. 15 shows two overlapping faces C and D that are smaller in area than the convolution base and two overlapping faces A and B that are larger, as an aid in describing the invention still more fully.

In FIG. 15, in which four faces are involved in the indicated convolution base, face D and face C do not cover the convolution base entirely, and computation of Resultant Intensity on the indicated convolution base using equation (5) will not produce the properly anti-aliased result.

For the convolution base shown in FIG. 15, four distinct regions are identified as 1, 2, 3, and 4. In region 1, faces A and B are present. In region 2, faces A, B, and C are present, and in region 3, faces A, B, and D are present. Finally, in region 4, faces A, B, C, and D are present. The Resultant Intensity in each region can be computed using the concept described above using the faces involved in each region.

When opaque faces are to be displayed, the same general equation (5) is used with $Q = 1$. The opacity "Q" of translucent faces varies between 0 and 1; 0 indicates total translucency, and 1 indicates total opaqueness. The translucency "T" of a face is defined as the complement of the opacity of the face, i.e., $(1-Q)$.

Figure 3:
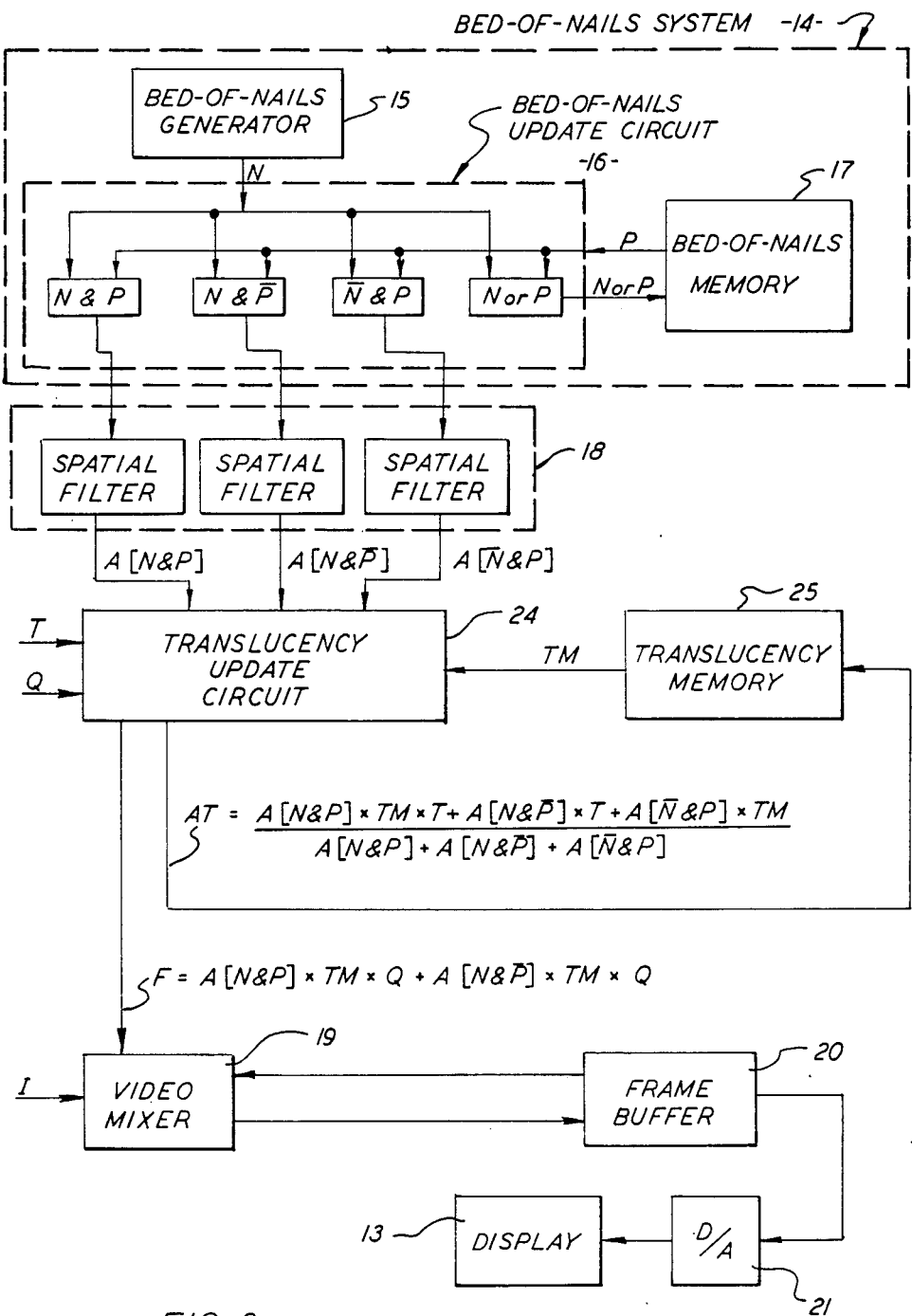
FIG. 3 is a circuit in block diagram form to show more details of the signal modifier circuit 12 of FIGS. 1 and 2.
Figure 4:
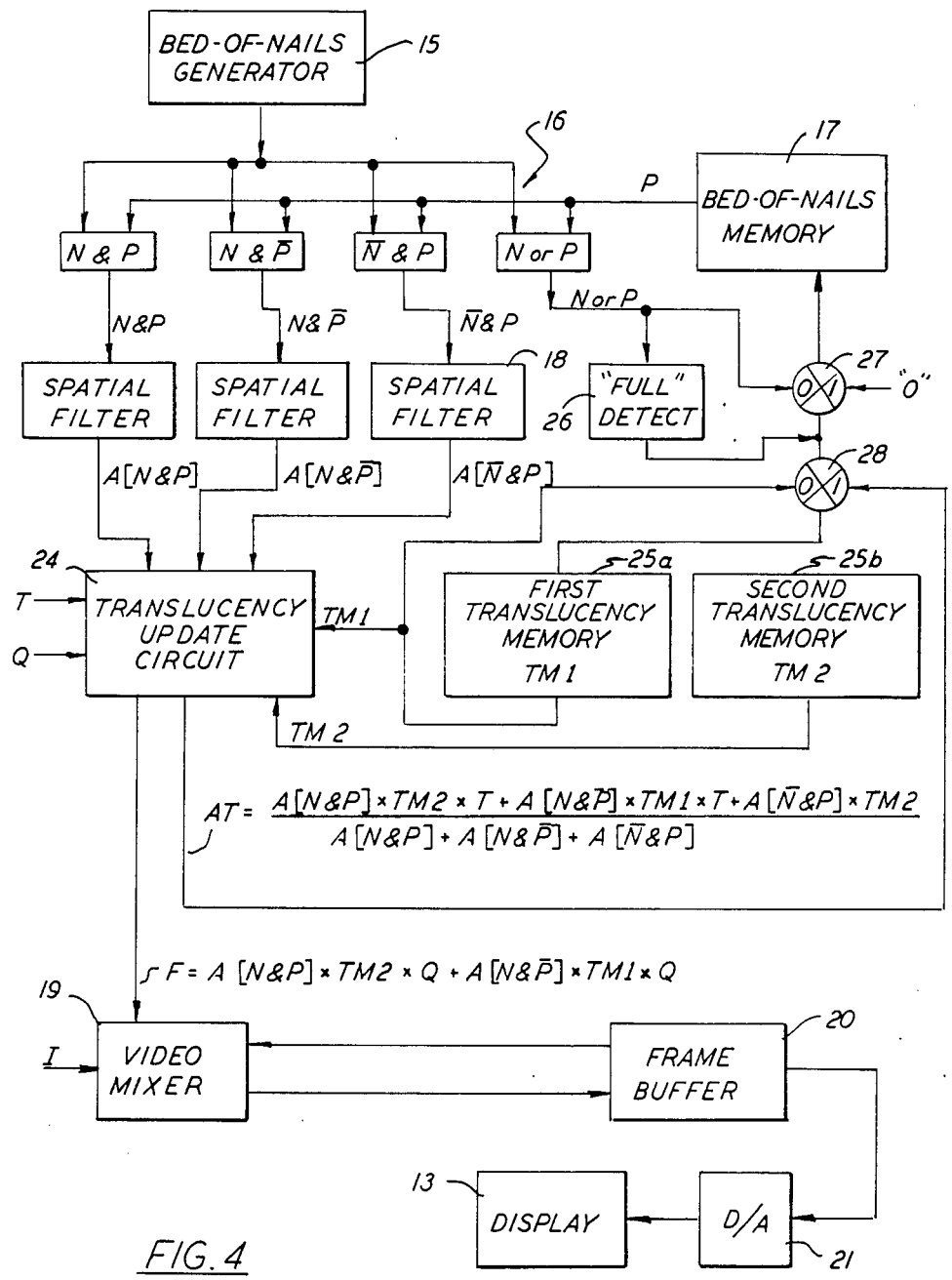
FIG. 4 is a circuit in block diagram form to show more details of the translucency update circuit of FIG. 3.

Use of the general equation (5) also has an additional advantage that it will avoid the distractions from realism caused by "popping", i.e., when faces are transitioned suddenly from an opacity of less than 1 to up to an opacity equal to 1, total opacity, or vice versa. Before describing the details of the circuitry as shown in FIGS. 3 and 4, there will be presented now a more detailed description of this general equation and some illustrative examples.

Referring first to FIG. 15 of the drawings, three translucent faces B, C, and D and one opaque background face A on a "convolution base" of a sample point. The area of the "convolution base" is divided into 4 regions of Intensity, identified as 1, 2, 3 and 4. In each region, the Resultant Intensity due to all of the faces, both translucent and opaque, affecting that region are computed with the opacities of the faces that are involved. The exact anti-aliased Resultant Intensity for the sample point, i.e., the entire "convolution base", is given by the area-weighted Intensities of all of the 4 regions that are within the "convolution base".

Of the four faces shown in FIG. 15, face A is the lowest priority background face, which is opaque. The opacity of these four faces is represented as follows: QA, QB, QC and QD, respectively. The Intensity of the four faces is represented by: IA, IB, IC, and ID, respectively. Since the face A is opaque, QA=1.

Using the top-down method of determining Intensity, the face D is processed first. TM1 is set initially to a 1 at the beginning of video processing and, therefore, the average translucency stored in TM2 is (1−QD). The Intensity written into the frame buffer 20, FIG. 3, for this sample point is [D]QD×ID. The faces C and B are processed next in the same way, and finally, the face A is processed last.

The processing is completed for a sample point when the FULL signal is "true" and the computed average Intensity is equal to zero.

For the illustration given, the Resultant Intensity accumulated is the correct Intensity although the equation described is only an approximation. The implementation of this approximation requires a circuit arranged as shown in FIG. 2 of the drawings. Since the equation (5) above produces a solution for transparent faces in the situation shown in FIG. 4, it will also produce a solution when all of the faces are opaque. That this is correct can be demonstrated by making QA=QB=QC=QD=1 in the Resultant Intensity in equation (5).

In accordance with the present invention, the approximation is obtained by computing an area-weighted average translucency for each sample point for a combination of the faces visible at each sample point. As will be understood by one skilled in this art, the real-world practical utilization of the invention requires a constant updating of the scene shown on the screen of the display device. This requires the approximation to be constantly varied and adjusted. As a scene changes, it may change in accordance with the illustration in FIG. 15 to that shown in FIG. 16.

In such a change, the new area as it becomes visible is added to that already visible and calculated previously, and by the same means, any area which is no longer visible is subtracted from the sum of the intensities for that particular sample point. This is the purpose of the "translucency update circuit" identified by the numeral 24 in FIGS. 3 and 4 of the drawings.

An electrical circuit to implement the equations identified above will have component parts interconnected and arranged as illustrated in FIGS. 3 and 4 of the drawings by the video processor 22 which interfaces with the geometric processor 23, see FIG. 2, in order to receive geometric and any other information which describe the face that is assigned initially the highest priority listing by the priority equation. In the above illustration, this face is identified as "face D" because the face D is determined to be unocculted as viewed by the trainee pilot on the display 13.

The vertical integrator circuit 10 is the first component in the video processor 22 to act upon information received from the geometric processor 23. The vertical integrator circuit 10 provides the beginning edge parameter and the ending edge parameter to the skip over logic circuit 11.

The skip-over logic circuit 11, in turn, determines which set of pixels are already covered by the face A and which of these pixels have been previously completely covered by a higher priority face so that they need not be processed further. On the other hand, the set of pixels that are totally or partially covered by the face A define a set of sample points which are candidates for further processing.

As illustrated in the various examples above, the Intensity of any one sample point is affected by surrounding pixels also. If any one of the pixels is intersected by an edge of a face, then the sample point is a candidate for still further processing. However, this is explained in Ser. No. 394,229.

The skip-over-logic circuit 11, therefore, (in FIG. 2) takes the candidate sample points and makes a decision for each sample point as to whether or not the face is visible or non-occulted. The skip-over-logic circuit 11 functions to provide the signal modifier circuit 12 with the information only as to which sample points are visible. These sample points that are determined by the skip-over-logic circuit 11 to be non-visible or occulted, are "skipped over" by the signal modifier circuit 12.

Accordingly, the skip-over-logic circuit 11 provides to the signal modifier circuit 12 the information that the sample points are to be processed further. In particular, this information is conveyed in a sequential manner to the Bed-of-Nails system 14.

The newest simulators today can train all members of military air crews in the operation and tactical employment of sensors and weapon systems within a realistic mission scenario. These full mission weapon system trainers enable entire crews to develop tactical judgment, crew coordination and weapon delivery proficiency in hazardous flight conditions and hostile environments without risk of aircraft damage or loss of life.

To explain mathematically the operation of a circuit as shown in FIG. 3 of the drawings, a letter followed by a square bracket indicates the fractional area represented by each "nail" in the Bed-of-Nails identified inside the square bracket, which in this illustrative example is 16 bit data. "P" is the Bed-of-Nails 16 bit data that is stored in the Bed-of-Nails memory circuit 17 before the current face is processed, and "N" is the Bed-of-Nails data of the current face on the convolution base of the sample point that is being processed now.

"TM" is the average translucency data that is stored in the translucency memory before the current face is being processed. As far as the new face with Bed-of-Nails data "N" is concerned, it sees a uniform face with Bed-of-Nails data "P" and translucency data "TM".

For a more complete description of the Bed-Of-Nails system 14 shown in FIG. 3 of the drawings as well as the Bed-Of-Nails Update Circuit 16 and the spatial filter circuit 18, the disclosure in application Ser. No. 394,229 filed July 1, 1982 and assigned to the same assignee as the present invention is specifically incorporated by reference for that purpose.

The geometric processor 23 defines the outlines (like a "painter"), and the video processor 22 paints within the boundaries of those outlines, i.e., to paint in the intensities. For constant values, it would be a relatively easy process of "painting", but these intensities are always changing.

The "frame buffer" 20 is like the cloth (the "canvas").

Within 33 miliseconds to complete one entire frame, the intensity is determined for each pixel, stored in a memory and the skip over logic circuit 11 skips that pixel as other levels are calculated in a top-down system.

This is done for an entire frame, stored in one memory, and as that memory is being read out, the next frame is being calculated and stored in another memory.

The "bookkeeping" is relatively simplified because the processing of only one polygon at a time. Therefore, it is a memory-intensive system. However, memory devices are becoming less expensive regularly.

For the easiest to define, the least expensive to fabricate, and the most efficient to operate circuit in accordance with the present invention, it will operate in accordance with this definition of "translucency": for the top-most surface is represented by the expression $Q \times I$, and the intensity for whatever is behind the top-most surface is represented by the expression $1-Q$.

In order to facilitate an understanding of the operation of the translucency update circuit 24 in FIG. 3 of the drawings, an illustrative example will now be given referring more particularly to FIG. 16 of the drawings. The following description traces the processing of each of the three faces 0, 1 and 2 for the convolution base indicated.

In accordance with the top-down priority order of processing, the face 2 is processed first. At this point, "P" is all zeros (since the Bed-of-Nails memory circuit 17 is cleared initially), N=B2 (since the Bed-of-Nails data of the face 2 on the convolution base is denoted by B2), Q=Q2, and T=T2. Therefore, $A[N.P]=0$, $A[N.\overline{P}]=A[B2]$, and $A[\overline{N}.P]=0$. As identified previously, "N" is the 16 bit Bed-of-Nails data of the current face being processed, and "P" is the 16 bit Bed-of-Nails data that is stored in the memory circuit 17, FIG. 3. The expression "N.P" is the logical "AND" of the two data "N" and "P". A "bar" over a data symbol indicates the "complement" of the data.

Substituting these values into the equation for "F" in FIG. 4, the Intensity contribution from the face 2 is given by the following relationship:

$$A[B2] \times Q2 \times I2 \qquad (11)$$

and substituting into the equation for "AT" in FIG. 4, the average translucency (denoted by AT2 to indicate average translucency after the face 2 is processed) stored in the translucency memory is given by the following mathematical relationship:

$$AT2 = T2 \qquad (12)$$

Also, the new Bed-of-Nails data that is stored in the Bed-of-Nails memory circuit 17 is given by the relationship: $N+P=B2$.

The face 1 is processed next. At this point, P=B2, N=B1, tm=T2 (that is, the average translucency after the face 2 is processed), P=P1, and T=T1. Thereafter, $A[N.P]=A[B1.B2]$, $A[N.\overline{P}]=A[B1.\overline{B2}]$, and $A[\overline{N}.P]=A[\overline{B1}.B2]$.

The Intensity contribution from the face 1 is, therefore:

$$(A[B1.B2] \times T2 \times Q1 + A[B1.\overline{B2}]) \times I1$$

and the average translucency (AT1) that is stored in the translucency memory is given by the following mathematical relationship identified as equation (13):

$$AT1 = \frac{A[B1.B2] \times T2 \times T1 + A[B1.\overline{B2}] \times T1 + A[\overline{B1}.B2] \times T2}{A[B1 + B2]}$$

In the above equation, "B1+B2" indicates the logical "union" (combining the numbers logically) of the two Bed-of-Nails data. The new Bed-of-Nails data that is stored in the Bed-of-Nails memory circuit 17 is given by the relationship:

$$N+P = B1+B2 \qquad (14)$$

The average translucency is given by the area-weighted translucency of the three regions (namely, B1.B2, $\overline{B1}$.B2 and B1.$\overline{B2}$) of the union of the current face data and the previous face data.

Also, note that the Intensity contribution of the face 1 is due to two regions (namely, B1.B2 and B1.$\overline{B2}$) of the face 1; the contributions from the two regions are weighted by their respective area on the convolution base.

Finally, the opaque face "0" is processed. At this point, $P=B1+B2$, "N" is all ones, TM=AT1, Q=1 (since the face "0" is opaque) and T=0 (again, since the face "0" is opaque). Therefore, $A[N.P]=A[B1+B2]$, $A[N.\overline{P}]=A[\overline{B1+B2}]$, and $A[\overline{N}.P]=0$.

The Intensity contribution from the face "0" is given by the following mathematical relationship which is equation )15):

$$(A[B1+B2] \times AT1 + A[\overline{B1+B2}] \times I0 \qquad (15)$$

The computed average translucency (AT0) after the face "0" is processed is given by the relationship AT0=0 and the Bed-of-Nails of the union of all faces processed thus far (N+P) is all ones.

This condition indicates that the average translucency of the entire area of the convolution base is zero and no Intensity will be transmitted from any face behind it. This condition, therefore, indicates that processing on the sample point with this convolution base is completed.

The total Intensity contribution from the faces on the convolution base, therefore, is given by the following mathematical relationship, which is identified as equation (16):

$$A[B2] \times Q2 \times I2 + (A[B1.B2] \times T2 \times Q1 + A[B1.\overline{B2}]) \times I1 \\ + (A[B1+B2] \times AT1 + A[\overline{B1+B2}]) \times I0$$

Figure 16:
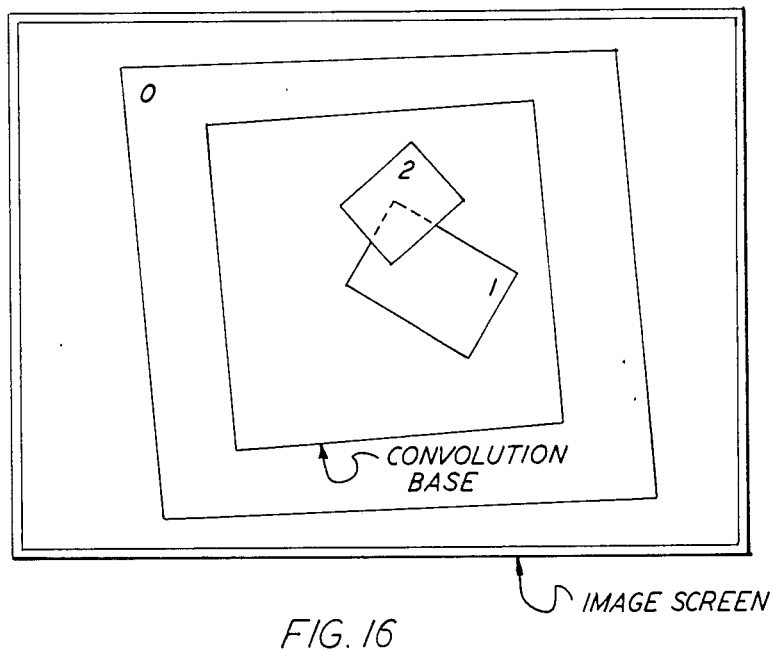
FIG. 16 is a view of two overlapping faces 1 and 2 that are smaller in area than the convolution base and a simplified larger face O.

It can be shown that the above relationship is the exact anti-aliased Resultant Intensity and is equal to one obtained by area-weighted averaging of the Intensities in the four distinct regions on the convolution base in FIG. 16. Therefore, while the Average Translucency approximation to the exact anti-aliased solution is only an approximation and will not give the exact anti-aliased result in all situations, it does give the exact anti-aliased result in most cases that are encountered in flight simulation, including the above described example.

Another characteristic of the Average Translucency equation is that it treats both opaque and translucent faces with a single unified relationship; opaque faces are simply special cases where T=0 and Q=1 of the general translucent faces. Moreover, if all of the faces involved in a convolution base are opaque, then the Average Translucency will give the anti-aliased result under all situations.

This can be seen by noting that when all of the faces are opaque, the Average Translucency computed and stored in the Translucency Memory is always "zero". The net result is that the Intensity contribution from each face is simply $A[N.\overline{P}] \times I$, i.e., the Intensity of the face multiplied by the visible fractional area of the face. The fact that the Average Translucency relationship always gives the anti-aliased result when all of the faces involved are opaque is important, because most of the faces in a typical flight simulation scene are opaque.

Figure 17:
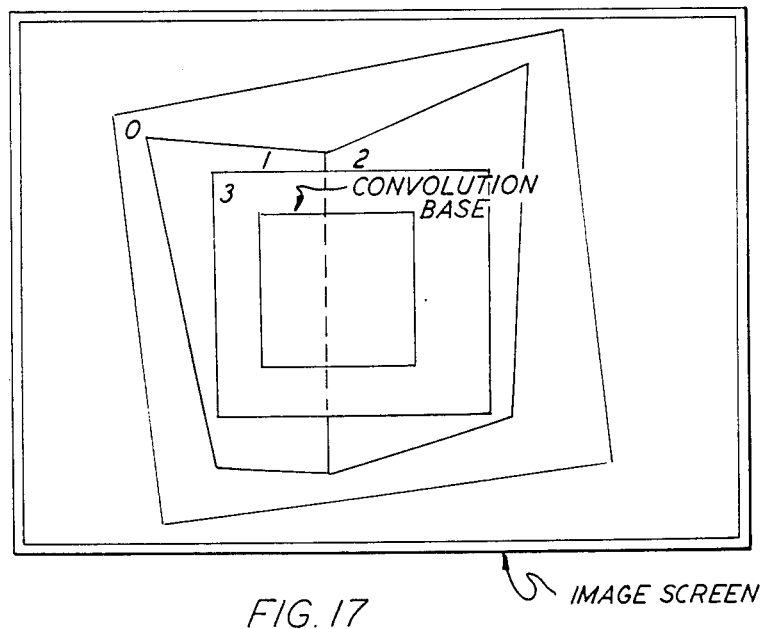
FIG. 17 shows a still more complicated arrangement of overlapping faces and face edges as a further aid in describing the invention.

To refine further the Average Translucency relationship to give anti-aliased result in situations where multiple layers of translucent faces overlap on a convolution base, the concept of a layer of faces on a convolution base is described in connection with FIG. 17 of the drawings. Referring now to FIG. 17, the first layer on a convolution base consists of the top faces whose union covers the entire convolution base for the first time.

The second layer consists of the next several faces whose union again covers the entire convolution base. Subsequent layers are defined in a similar manner. Thus, the three faces in FIG. 16 constitute one layer.

In the example shown in FIG. 17, however, the face 3 constitutes the first layer, face 2 and face 1 constitute the second layer, and the face 0 constitutes the third layer. For convolution bases with more than one layer of faces involved in the Intensity computation (such as the one shown in FIG. 17), the previously described Average Translucency mathematical relationship will not give the exact anti-aliased result.

In order to compute the exact anti-aliased result for multiple layers such as those shown in FIG. 17, the Average Translucency relationship is modified slightly in the following described manner. The idea of this modified relationship is to use an additional memory location (for each sample point) to store the Average Translucency computed for the completed layers processed thus far and clear the Bed-of-Nails memory location when a layer is completed on the convolution base.

The clearing of the Bed-of-Nails memory on a convolution base when a layer is completed allows the occultation relationship of faces in the next layer to be maintained. The block diagram of the multilayered Average Translucency relationship implementation is shown in FIG. 4 of the drawings.

An explanation of the symbols used in FIG. 4 is as follows. The "FULL DETECT" circuit 26 checks the union of "N" and "P". If the union is all ones, indicating that a layer is completed, then the Full Detect circuit 26 emits a signal that is equal to "1".

There are two two-to-one multiplexor circuits 27 and 28 in order to select one of the two input sources to be the output. This selection process is controlled by the FULL signal from the Detect circuit 26.

In FIG. 4, the multiplexor circuit 27 selects all zeros as output to the Bed-of-Nails memory circuit 17 when the FULL signal is equal to "1". Therefore, the Bed-of-Nails memory circuit 17 is cleared when a layer is completed on the convolution base. Otherwise, the union of "N" and "P" is stored.

The first Translucency Memory circuit 25a stores the combined Average Translucency data of all completed layers processed thus far. The second Translucency Memory circuit 25b stores the Average Translucency of the union of faces of the current uncompleted layer. The Average Translucency is computed by taking into account the effect due to completed layers (whose combined translucency is stored in the first Translucency Memory circuit 25a). When the current layer is completed, the Average Translucency computed is, therefore, the combined Average Translucency of all of the completed layers processed thus far.

The multiplexor circuit 28, therefore, selects the newly computed Average Translucency to be connected to the first Translucency Memory circuit 25a when the current layer is completed as indicated by the FULL signal being a "1". Otherwise, the value that is stored in the first Translucency Memory circuit 25a is unchanged. The first Translucency Memory circuit 25a is set initialy to have a value of "one" in all sample points to indicate the fact that at the beginning of processing, all of the convolution bases are covered entirely by a totally translucent face.

Referring now more particularly to FIGS. 3 and 4 of the drawings, the equations illustrated therein are subject to the following definitions: The Average Translucency (AT) is defined as the area of a new face (N) and the area of previous faces (P) multiplied by the Translucency stored in memory 25b plus the area of a new face (N) and NOT the areas of previous faces (P) multiplied by the Translucency factor stored in memory 25a.

It should be noted particularly in FIG. 3 of the drawings that only two memories are needed in accordance with the present invention. Both of these memories work in parallel, i.e., they are loaded at the same time and read out at the same time.

Note also in FIG. 3 of the drawings that the Translucency Update Circuit 24 involves the mathematical step of "multiplying". The more translucent surfaces that are involved, the more memory devices will be required, unless the principles of the invention are used.

The 2×2 convolution means: getting the contribution to the intensity in one pixel from the intensity in adjacent pixels.

To understand the multi-layered Average Translucency mathematical relationship better, the computation of Resultant Intensity on the convolution base shown in FIG. 17, using the multi-layered Average Translucency circuit arrangement depicted in FIGS. 3 and 4 of the drawings, is described in more detail as follows.

In FIG. 17 of the drawings, face 3 is processed first. At this point, "P" is all zeros, "N" is all ones, "TM1"=1 (since the first Translucency Memory circuit 25a is set initially to have the value of (1), Q=Q3, and T=T3. Therefore, $A[N.P]=0$, $A[N.\overline{P}]=1$, and $A[\overline{N}.P]=0$.

The Intensity contribution from the face 3 is given by the following mathematical expression:

$$Q3 \times I3 \qquad (17)$$

and the Average Translucency (AT3) stored in the second Translucency Memory circuit 25b is given by the relationship:

$$AT3 = T3. \qquad (18)$$

Since "N" is all ones, the "FULL" signal from the circuit 26 is "1" and the first layer is completed. Thus, the Bed-of-Nails memory 17 is cleared and AT3=T3 is stored in the first Translucency Memory circuit 25a.

Face 2 is processed next. At this point, "P" is all zeros (due to clearing after the face 3 is processed), N=B2, TM1=T3, TM2=T3, T =T2, and Q=Q2.

Therefore, $A[N.P]=0$, $A[N.\overline{P}]=0$, and $A[\overline{N}.P]=A[B2]$. The Intensity contribution from the face 2 is given therefore by the relationship:

$$A[B2] \times T3 \times Q2 \times I2 \qquad (19)$$

and the Average Translucency (AT2) stored in the second Translucency Memory circuit 25b is given by the relationship:

$$AT2 = T3 \times T2 \quad (20)$$

Since N+P is not all ones, the current layer is not completed yet. Notice at this point that "AT2" corresponds to the Average Translucency computed for the area occupied by the face 2 with the effect of the previous layer also taken into account. Since N+P is "B2", the new Bed-of-Nails data that is stored in the Bed-of-Nails memory circuit 17 is "B2".

The face 1 is processed next. At this point, P=B2, N=B1, TM1=T3, $TM2 = T3 \times T2$, T=T1, and Q=Q1.

Since B2 and B1 are disjoint, $A[N.P] = 0$, $A[N.\overline{P}] = A[B1]$ and $A[\overline{N}.P] = A[B2]$.

The Intensity Contribution from the face 1 is given by the following relationship:

$$A[B1] = T3 \times Q1 \times I1 \quad (21)$$

and the Average Translucency (AT1) stored in the second translucency memory circuit 25b is given by the following mathematical relationship:

$$AT1 = \frac{A[B1] \times T3 \times T1 + A[B2] \times T3 \times T2}{A[B1] + A[B2] = 1} \quad (22)$$

Since N+P is all ones, the "FULL" signal from the circuit 26 (FIG. 4) is "1", and therefore, the second layer is completed. Thus, the Bed-of-Nails memory circuit 17 is cleared, and AT1 is stored in the first Translucency Memory circuit 25a.

Finally, the opaque face "0" is processed. At this point, "P" is all zeros, "N" is all ones, TM1=AT1, TM2=AT2, T=0, and Q=1. Therefore, $A[N.P]=0$, $A[N.\overline{P}]=0$, and $A[\overline{N}.P]=1$.

The Intensity Contribution from the face "0" is given by:

$$AT1 \times I0 \quad (23)$$

and the Average Translucency (AT0) stored in the second Translucency Memory circuit 25b is given by:

$$AT0 = 0 \quad (24)$$

Since N+P is all ones, the "FULL" signal is "1" from the circuit 26. The fact that the "FULL" signal is "1" and the Average Translucency is "zero" indicates that no more Intensity data will be transmitted from any face behind, and processing on the convolution base is completed. The total Intensity Contribution from all faces, therefore, is given by the following mathematical relationship, which is equation (25);

$$Q3 \times I3 + A[B2] \times T3 \times Q2 \times I2 + A[B1] \times T3 \times Q1 \times I1 + AT1 \times I0$$

It is apparent that the above mathematical relationship is the exact anti-aliased result and is equal to "one" obtained by area-weighted averaging of the Intensities in the three distinct regions on the convolution base shown in FIG. 17.

Although specific embodiments of the present invention have been described herein, it will be apparent to those skilled in the art, in view of the detailed disclosure presented herein, that various modifications may be made without departing from the spirit of the invention. With the foregoing in mind, it is understood that the invention is intended to be limited solely by the appended claims.

What is claimed is:

1. In a computer image generator having geometric processor means to prioritize faces of images to be displayed and for providing predetermined intensity information for said faces, having at least one video processor means including memory means to store temporarily information on each point to be displayed, and having display means to produce a visual representation of said images to be displayed, said video processor means comprising:

integrator circuit means connected to receive information from said geometric processor means on the priority and the intensity assigned to each face of images to be displayed;

skip-over logic circuit means connected to receive information from said integrator circuit means to identify any areas in the faces of images to be displayed not requiring further intensity modification, and separating such identified areas for temporary storage;

translucency update circuit means connected to receive information from said skip-over logic circuit means to identify those areas requiring further intensity modification in accordance with an assigned priority, the translucency update circuit means including:

means to separate each area that requires further intensity modification into its own path and for modifying the intensity of each area that is separated in accordance with the relationship:

$$AT = \frac{A[N\&P] \times TM \times T + A[N\&\overline{P}] \times T + A[\overline{N}\&P] \times TM}{A[N\&P] + A[N\&\overline{P}] + A[\overline{N}\&P]}$$

where:
AT = Average Translucency,
A = Area inside brackets,
N = current face data value,
P = previous face data value,
& = the logical AND,
TM = Translucency value,
$\overline{P}$ = complement of P,
$\overline{N}$ = complement of N;

means to recombine the informationn from each path after intensity modification to form a combined signal according to the relationship:

$$F = A[N\&P] \times TM \times Q + A[N\&\overline{P}] \times TM \times Q$$

where:
F = the Resulting Intensity,
A = a fractional area,
N = the current intensity,
P = the previous intensity,
TM = data stored in memory,
& = a logical AND value,
Q = the opacity data value,
$\overline{P}$ = the complement of P;
and circuit means to connect said combined signal from said translucency update circuit means to said display means.

2. In a video processor for providing, from input faces, an image described by pixel intensities; said video processor comprising a vertical integrator, skip-over logic, a bed-of-nails having a bed-of-nails memory, a spatial filter, a video mixer, and a translucency effects system, said translucency effects system comprising:

a translucency memory for storing an average translucency parameter associated with each pixel of the image; and a translucency update circuit for updating the translucency memory and for modifying the intensities of image pixels in accordance with translucency effects according to the relationship:

$$AT = \frac{A[N\&P] \times TM2 \times T + A[N\&\overline{P}] \times TM1 \times T + A[\overline{N}\&P] \times TM2}{A[N\&P] + A[N\&\overline{P}] + A[\overline{N}\&P]}$$

where:
AT = Average Translucency,
N = the Bed-of-Nails data, current face,
P = the Bed-of-Nails data, previous face,
A = the "Nail" Area inside the bracket,
& = a logical AND of data N and P,
TM1 = the Translucency data in Memory 1,
TM2 = the Translucency data in Memory 2,
T = Translucency data value,
$\overline{N}$ = the complement of N,
$\overline{P}$ = the complement of P;

said translucency update circuit is connected so that it receives, as inputs for each pixel process from each face, translucency and opacity values output by the spatial filter; the area of the visible portion of the pixel contribution for the current face, the area of the occluded portion of the pixel not covered by the current face, and the area of the pixel covered by both previous and current faces, said areas as output by the spatial filter; and the translucency parameter as output by the translucency memory; said translucency update circuit subsequently updates the average translucency parameter, outputting it back to the translucency memory, and also outputs an intensity modification factor to the video mixer according to the relationship:

$$F = A[N\&P] \times TM2 \times Q + A[N\&\overline{P}] \times TM1 \times Q$$

where:
F = the Resulting Intensity,
A = a fractional area,
N = the current intensity,
P = the previous intensity,
TM2 = data stored in memory 2,
TM1 = data in memory 1,
Q = the opacity data value,
$\overline{P}$ = the complement of P, for modifying the intensity contribution for the effects of translucency.

3. The translucency effects system of claim 1 wherein the translucency update circuit computes the intensity modification factor as a product of the area of the contribution of the face to the pixel, the average translucency parameter prior to update, and the opacity of the face.

* * * * *